UNITED STATES PATENT OFFICE.

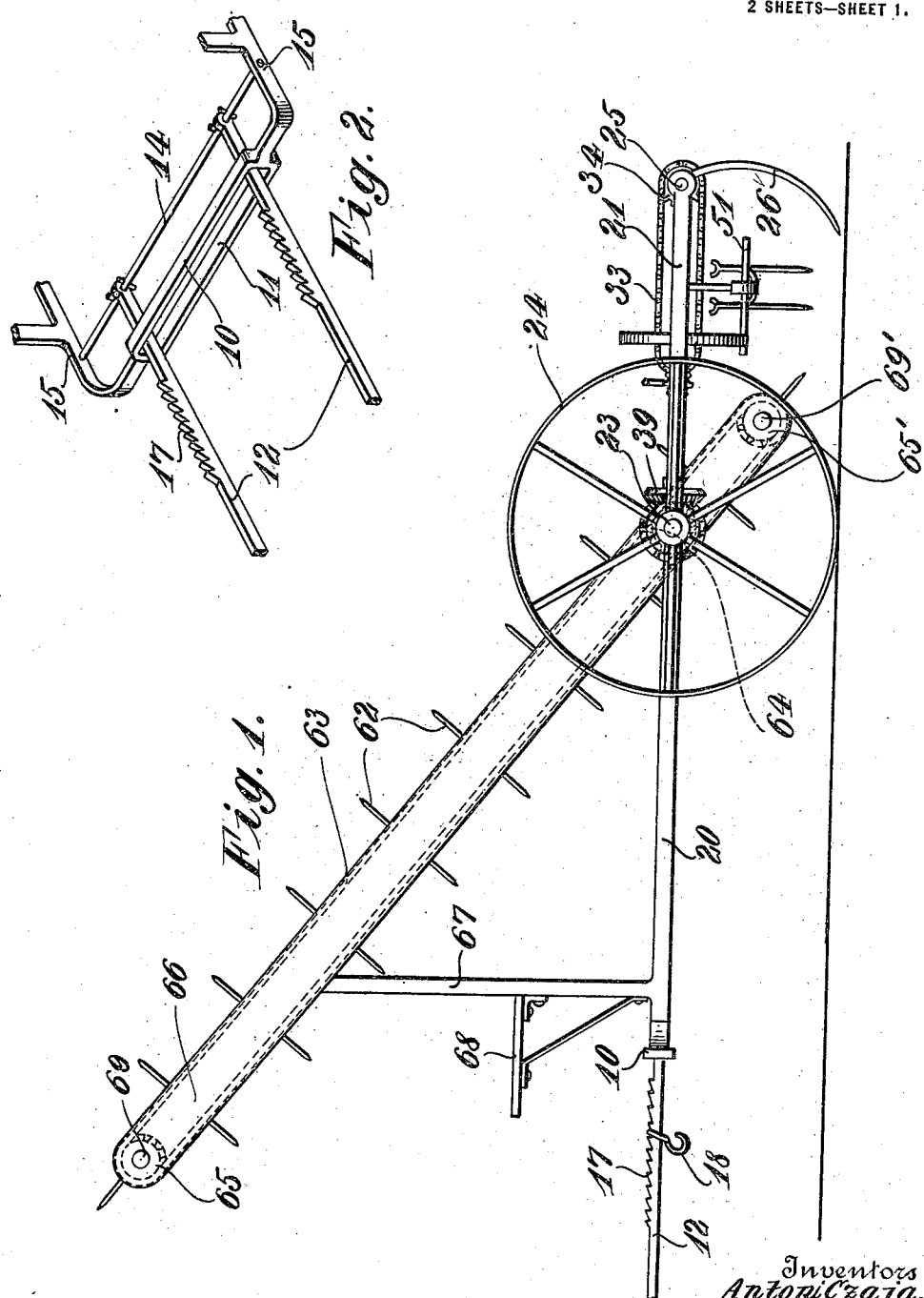

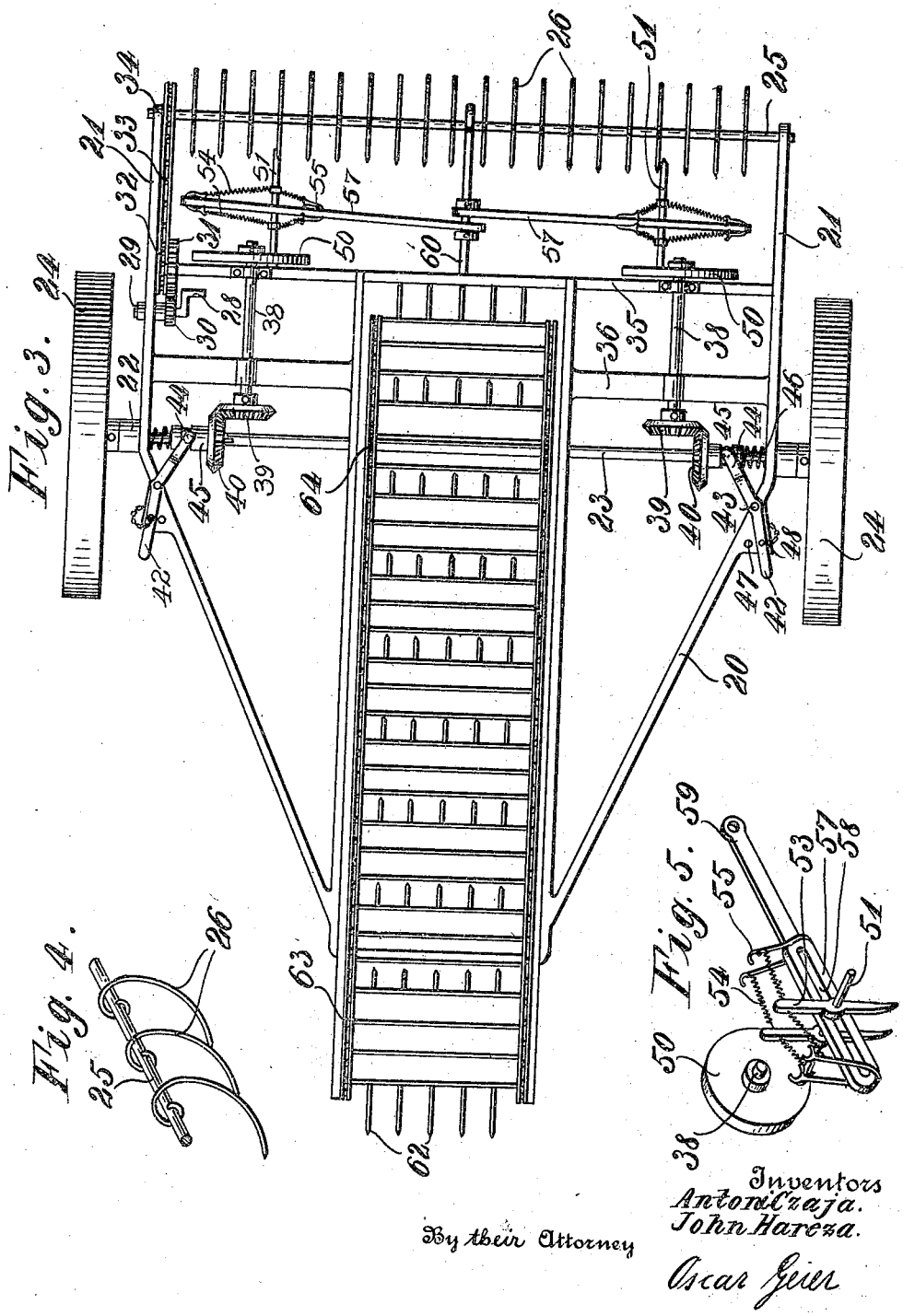

ANTONI CZAJA AND JOHN HAREZA, OF GARY, WEST VIRGINIA.

CONVEYER-RAKE AND STACKER.

1,262,756.

Specification of Letters Patent.

Patented Apr. 16, 1918.

Application filed February 16, 1917. Serial No. 148,961.

*To all whom it may concern:*

Be it known that we, ANTONI CZAJA, a subject of the Emperor of Austria, resident of Gary, county of McDowell, and State of West Virginia, and JOHN HAREZA, a subject of the Emperor of Austria, resident of Gary, county of McDowell, and State of West Virginia, have invented certain new and useful Improvements in Conveyer-Rakes and Stackers, of which the following is a specification.

This invention relates to improvements in agricultural implements, and has as its principal object the provision of means whereby hay, straw, and the like may be gathered on a field into rows, the same delivered to a stacking device and then deposited wherever it may be desired.

A further object is to provide such implements in forms which may be used as a rake alone or as a stacker independently of the rake.

These and other similar objects are attained by the novel construction and combination of parts hereafter described and shown in the accompanying drawings, forming a material part of this specification, and in which:—

Figure 1 is a side elevational view of an implement made in accordance with the invention.

Fig. 2 is a perspective view of the front part of the apparatus.

Fig. 3 is a plan view of the implement looking from the top.

Fig. 4 is a perspective view showing a section of the rake device, and

Fig. 5 is a perspective view showing one of the means of gathering the hay or straw centrally of the implement.

The apparatus consists of an essentially bow-shaped frame structure, the front element 10 of which has an open slot 11 which partially supports the shafts or draft-rods 12 secured upon the bar 14 passing between the sides 15 of the frame, the shafts having upon their upper surface a plurality of teeth 17 adapted to engage with the hook links 18 to which the harness of the draft animals employed are attached.

Formed with the sides 15 are angularly disposed elements 20 terminating in straight parallel sides 21 to which are secured bearings 22, for the axle shaft 23, having at its ends the wheels 24 upon which the frame is supported.

At the rear, outer ends of the frame elements 21 is mounted a rotatable rod or bar 25 to which, at regularly spaced intervals, are secured resilient hooked teeth 26, the same being of such length that their lower curved ends closely approach the ground over which the apparatus is moved.

These rake teeth may be reversed and held out of operative position by operating the handle 28 on the crank shaft 29, mounted in one of the frame sides 21, the crank shaft carrying a pinion 30, engaging with a gear 31 rotatable on a stud, and attached at its side is a sprocket 32 conveying motion by means of the chain 33 to a similar sprocket 34 fixed upon the extreme outer end of the rod 25.

A transversely disposed rigid bar 35 extends between the side elements 21, similar bars 36 being arranged parallel thereto, and on these bars are bearings for the shafts 38, driven through the bevel pinions 39 and 40, the latter being slidably keyed on the axle shaft 23 and movable into or out of engagement with the mating gear by means of the handles 42 pivoted on the pins 43, the levers having yokes 44 engages with the hubs 45 of the gears 40, so as to slide the same longitudinally on the axle shaft 23, being held in normal operative position by means of the springs 46.

Holes 47 are provided in plates extending outward from the frame sides 21 receptive of the pins 48 attached to the levers and by which the gears 40 are maintained in an adjusted position, that is so the gears are in or out of engagement.

At the opposite rear ends of the shafts 38 are rigidly attached disks 50 in which are fixed pins 51 the same being operated in the manner of a crank when the disks 50 are rotated, on which are journaled a plurality of toothed elements 53 held normally in vertical position by means of the springs 54, the outer ends of which are attached to rigid rods 55 extending upward from the end of links 57, the links containing slots 58 within which the pins 51 operate, the opposite end 59 of the links 57 being pivoted upon a fixed bear 60 rigidly engaged with the cross bar 35 and rod 25.

Thus it will be seen that as grain or hay is gathered by the rake it is brought centrally of the machine and into position to be operated upon by the elevating forks 62 carried upon an endless chain 63 driven by a sprocket 64 fixed upon the axle shaft 23 the chain being carried around sprockets 65 and 65' mounted on shafts 69 and 69' at the ends of the frame 66, which is carried on the shaft 23 and partially supported at its front end by the uprights 67 attached to the frame sides 21, which also supports the seat 68 for the driver.

From the foregoing, taken in connection with the drawings, the construction and operation of the machine will be understood.

Having thus described our invention, what we claim as new, and desire to secure by Letters Patent, is:—

The combination with a hay rake having a frame, an axle rotatable therein, and a plurality of spaced operative teeth at the rear of said frame, of a pair of shafts journaled parallel within said frame, bevel gears secured on the front ends of said shafts, mating gears slidably engaged on said axle, means for moving said mating gears into or out of engagement with the first named gears, disks carried on the rear ends of said shafts, crank pins set in said disks, a support rod secured in said frame extending outwardly centrally between said pins, a pair of opposed bars pivoted transversely on said rod, said bars having slots engageable with said pins, side rake teeth journaled on said pins, said side rake teeth operating at right angles to the main operative rear teeth of the rake, and spring connections carried by said slotted bars, engaged with said side rake teeth whereby they are normally held in an erect operative position.

In testimony whereof we have affixed our signatures this 5th day of February, 1917.

ANTONI CZAJA.
JOHN HAREZA.

Copies of this patent may be obtained for five cents each, by addressing the "Commissioner of Patents, Washington, D. C."